US010848723B2

(12) United States Patent
Liu et al.

(10) Patent No.: US 10,848,723 B2
(45) Date of Patent: Nov. 24, 2020

(54) SCREEN PROJECTION SYSTEM, METHOD AND APPARATUS

(71) Applicant: Rich Yard Investment Group Co., Ltd., Beijing (CN)

(72) Inventors: Jianjun Liu, Beijing (CN); Xiaobin Wu, Beijing (CN)

(73) Assignee: Rich Yard Investment Group Co., LTD., Beijing (CN)

( * ) Notice: Subject to any disclaimer, the term of this patent is extended or adjusted under 35 U.S.C. 154(b) by 0 days.

(21) Appl. No.: 15/833,545

(22) Filed: Dec. 6, 2017

(65) Prior Publication Data
US 2018/0139420 A1     May 17, 2018

Related U.S. Application Data

(63) Continuation of application No. PCT/CN2015/090632, filed on Sep. 25, 2015.

(30) Foreign Application Priority Data

Aug. 11, 2015 (CN) .......................... 2015 1 0490762
Aug. 11, 2015 (CN) ..................... 2015 2 0602648 U (51) Int. Cl.
*H04N 9/31*       (2006.01)
*G03B 21/56*     (2006.01)
(Continued)

(52) U.S. Cl.
CPC ............ *H04N 9/3147* (2013.01); *G03B 21/56* (2013.01); *G03B 21/60* (2013.01); *G03B 37/04* (2013.01); *H04N 9/3185* (2013.01); *E04H 3/22* (2013.01)

(58) Field of Classification Search
CPC ...... G03B 21/56; G03B 37/04; H04N 9/3147; H04N 9/3185; E04H 3/22
See application file for complete search history.

(56) References Cited

U.S. PATENT DOCUMENTS 5,097,640 A * 3/1992 Skolnick ............... E04B 1/3211
                                                       434/286
6,201,516 B1   3/2001 Tanide et al.
(Continued)

FOREIGN PATENT DOCUMENTS

CN       2667827 Y     12/2004
CN     102385238 A      3/2012
(Continued)

OTHER PUBLICATIONS

International Search Report and Written Opinion issued in International Application No. PCT/CN2015/090632 dated May 17, 2016 (5 pages).
(Continued)

*Primary Examiner* — Michelle M Iacoletti
*Assistant Examiner* — Danell L Owens
(74) *Attorney, Agent, or Firm* — Hamre, Schumann, Mueller & Larson, P.C.

(57) ABSTRACT

Embodiments of the present application provide a screen projection system, method and apparatus. The system includes a display screen, wherein the display screen is of a fully-closed or partially-closed housing structure, and an inner wall of the housing structure is configured to provide continuous images with a view angle of 180 degrees to 360 degrees in a horizontal direction. The system further includes: at least two groups of projectors, each group including at least one projector. The at least two groups of projectors are hierarchically arranged in a central axis direction of the display screen, each group of projectors is configured to carry out projection onto a portion of an inner wall of the display screen, and light paths of the at least two groups of projectors are configured to avoid audiences and seats. According to the present application, the technical solutions may be applied to different screens.

17 Claims, 8 Drawing Sheets

(a)

(b)

(c)

(51) Int. Cl.
  *G03B 37/04* (2006.01)
  *E04H 3/22* (2006.01)
  *G03B 21/60* (2014.01)

(56) References Cited

U.S. PATENT DOCUMENTS

| | | | | |
|---|---|---|---|---|
| 6,431,989 | B1* | 8/2002 | Katayama | A63G 31/16 434/55 |
| 9,097,968 | B1 | 8/2015 | Acevedo | |
| 9,470,967 | B1* | 10/2016 | Vorst | G03B 21/606 |
| 2005/0264879 | A1* | 12/2005 | Deter | G02B 13/16 359/451 |
| 2005/0275813 | A1* | 12/2005 | Yamazaki | G03B 21/13 353/94 |
| 2006/0152680 | A1 | 7/2006 | Shibano | |
| 2007/0009862 | A1* | 1/2007 | Quinn | G09B 9/00 434/38 |
| 2008/0043097 | A1 | 2/2008 | Smith | |
| 2011/0157694 | A1* | 6/2011 | Ferren | G03B 21/56 359/445 |
| 2015/0065260 | A1* | 3/2015 | Beyr | A63G 31/16 472/60 |
| 2016/0148526 | A1* | 5/2016 | Morris | G09B 9/04 434/62 |

FOREIGN PATENT DOCUMENTS

| | | |
|---|---|---|
| CN | 102540697 A | 7/2012 |
| CN | 202693982 | 1/2013 |
| CN | 204086783 | 1/2015 |
| CN | 104735380 A | 6/2015 |
| CN | 204456980 | 7/2015 |
| CN | 204906591 | 12/2015 |
| CN | 204906591 U | 12/2015 |
| JP | H07110650 A | 4/1995 |
| JP | H07129789 A | 5/1995 |
| JP | 2013250451 A | 12/2013 |
| JP | 2014197113 A | 10/2014 |

OTHER PUBLICATIONS

Gaitatzes et al., "Media Productions for a Dome Display System", Copyright 2006, 4 pages provided.

"The Tholos Project", Georgios Papaioannou, Department of Informatics Athens University of Economics and Business, Nov. 4, 2019, 2 pages provided.

Ed Lantz, A Survey of Large-Scale Immersive Displays, Association for Computing Machinery, Inc., Aug. 4, 2007, 7 pages provided.

* cited by examiner

SCREEN PROJECTION SYSTEM, METHOD AND APPARATUS

This application is based upon and claims priority to Chinese Patent Applications No. 201510490762.9 and No. 201520602648.6, filed before Chinese Patent Office on Aug. 11, 2015 and entitled "SCREEN PROJECTION SYSTEM, METHOD AND APPARATUS", and "SCREEN PROJECTION SYSTEM AND APPARATUS", the entire contents of which are incorporated herein by reference.

TECHNICAL FIELD

The present application relates to the technical field of displays, and in particular, relates to a screen projection system, a screen projection method and a screen projection apparatus.

BACKGROUND

This part is intended to provide a background or context for the embodiments of the present application described in the claims. The description herein shall not be considered as the related art due to inclusion on this part.

As a development trend, human information propagation technologies are constantly reducing information entropy, such that the information entropy finally approaches zero, that is, the realistic world is reproduced as much as possible. Since presence of movies, display screens are continuously under revolution, advancement and evolution.

The traditional screens are single-planar screens. However, in practice, the plane screen has a limited size, and fails to provide a non-boundary feeling to the audiences. No boundary refers to that the ordinary audiences fail to see the boundary between the image displayed on the display screen and the realistic world, that is, fail to see the boundary on the display screen, such that the audiences have a strong sense of immersion. For enhancement of the non-boundary feeling of the audiences, at present a plurality of types of available display screens have been developed, for example, multi-planar screens, dome screens and the like. Since different types of display screens have different shapes, their projection manners vary.

For example, U.S. Pat. No. 8,814,367B2 (authorized on Aug. 26, 2014) has disclosed a 3D image cinema system. The 3D image cinema system includes two planar display screens that are opposing to each other, a projection room is arranged between these two display screens, and a semi-transparent semi-reflection mirror is used to project the light rays from one projector to the two planar display screens simultaneously. However, the semi-transparent semi-reflection mirror has a poor imaging effect and a low image definition. In practice, this projection manner is seldom used.

Full dome movies, also referred to as "dome movies", are large-screen movies that appeared in the 1970s. The screen of the full dome movie is of a semi-spherical shape, ⅓ spherical shape, ¼ spherical shape or the like. The audiences are enclosed within the dome screen, and surrounding stereo is generally provided, such that the audiences have a sense of immersion.

Figure 1:
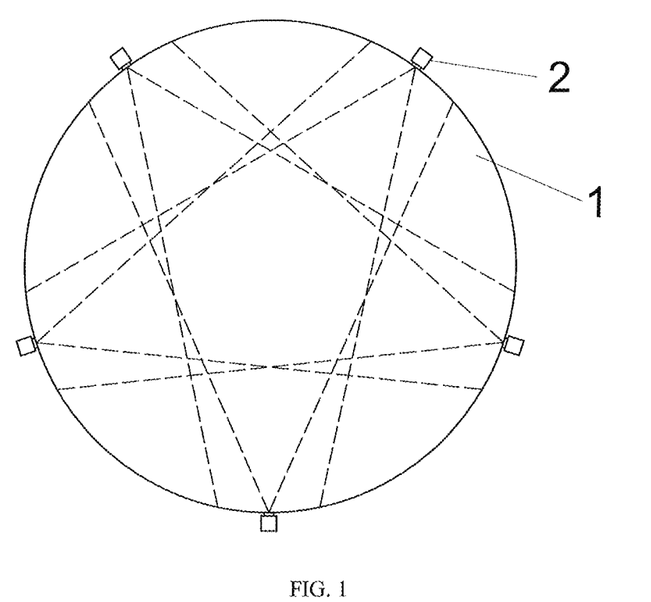
FIG. 1 is a schematic view of a dome screen projection mode in the background art.
Figure 2:
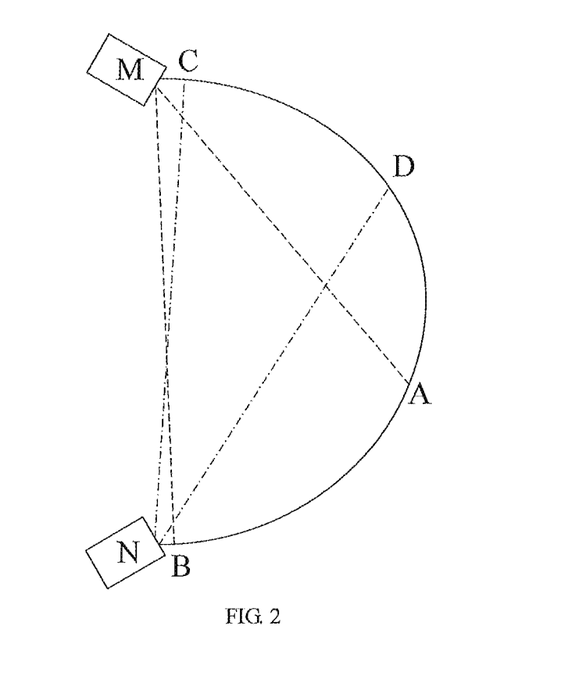
FIG. 2 is an axial cross-section view of orthogonal projection in the background art.

Due to its particular shape, the dome screen has a projection manner that is greatly different from that of the planar screen. In practice, the commonly used dome screen projection manner is orthogonal projection. That is, a plurality of projectors are evenly arranged at the edge of the semi-spherical screen, and the plurality of projectors is configured to project images onto the inner wall of the screen. Referring to FIG. 1, five projectors 2 are evenly arranged at the edge of a semi-spherical screen, each projector 2 is responsible for a fan projection region, and adjacent fan projection regions form a merging region therebetween, that is, the edges of the projected display images of the adjacent projectors overlap, and the two display images merged as one by means of the edge merging technique. A complete semi-spherical image is formed after all the display images is configured to merge, which covers the entire semi-spherical screen. Referring to FIG. 2, FIG. 2 is a schematic view of a cross section of a dome screen, and illustrates a projection range of two projectors of five projectors 2 in FIG. 2. In FIG. 2, the projection region of a projector M is represented by an are line AB, the projection region of a projector N is represented by an arc line CD, and the dotted lines represent projection light paths.

However, when the orthogonal projection is employed, to ensure that the light paths of the projectors are not shaded by the audiences, the audience seats need to be installed behind the projection light paths of the projectors. However, when the screen is of an irregular spherical shape, if the audience seats are installed behind the projection light paths, the audience may not acquire a full-degree display image.

SUMMARY

To solve one of the above technical problems, the present application provides a screen projection system, method and apparatus, wherein projection light paths are not shaded by audiences, and the technical solutions according to the present application may be applicable to different types of screens.

Embodiments of the present application provide a screen projection system, the system including a display screen, the display screen being of a fully-closed or partially-closed housing structure, an inner wall of the housing structure being configured to provide continuous images with a view angle of 180 degrees to 360 degrees in a horizontal direction; wherein the system further includes: at least two groups of projectors, each group including at least one projector;

wherein the at least two groups of projectors are hierarchically arranged in a central axis direction of the display screen, each group of projectors is configured to carry out projection onto a portion of an inner wall of the display screen, and light paths of the at least two groups of projectors are configured to avoid audiences and seats, the central axis being an axis that passes through a central point of the display screen so that the display screen is left-right symmetrical with respect to the central axis;

each group of projectors is configured to project, according to different projection regions, sub display images transversely segmented from a to-be-displayed image, the sub display images being spliced to form a complete to-be-displayed image.

In an embodiment of the present application, each projector in each group of projectors is configured to carry out projection on a portion of the inner wall of the display screen that is perpendicular to the central axis thereof; and each projector is configured to project longitudinal sub display images longitudinally segmented from the sub display image, the longitudinal sub display images being spliced to form the sub display image.

In an embodiment of the present application, at least one group of projectors in the at least two groups of projectors are configured to carry out projection onto a top portion of the inner wall of the display screen, and at least one group of projectors in the at least two groups of projectors are configured to carry out projection onto an intermediate portion of the inner wall of the display screen.

In an embodiment of the present application, the at least two groups of projectors are a first group of projectors that are arranged at an upper part in the central axis direction of the display screen, and a second group of projectors that are arranged at a lower part in the central axis direction of the display screen; wherein the first group of projectors is configured to carry out projection onto the intermediate portion of the inner wall of the display screen and is configured to project a lower-half image of the to-be-displayed image, and the second group of projectors is configured to carry out projection onto the top portion of the inner wall of the display screen and is configured to project an upper-half image of the to-be-displayed image.

In an embodiment of the present application, one merging side of the lower-half image of the to-be-displayed image is configured to merge with at least three merging sides of the upper-half image of the to-be-displayed image.

In an embodiment of the present application, the system further includes an image source processing apparatus, configured to segment an image according to the number of projectors and positions of the projectors, adjacent sub display images obtained upon segmentation having merging sides, and respectively transmit the sub display images obtained upon segmentation to corresponding projectors.

Embodiments of the present application further provide a screen projection method, applied to a screen projection system; wherein the system includes a display screen, the display screen being of a fully-closed or partially-closed housing structure, an inner wall of the housing structure being configured to provide continuous images with a view angle of 180 degrees to 360 degrees in a horizontal direction, wherein the system further includes: at least two groups of projectors, each group including at least one projector;

wherein the at least two groups of projectors are hierarchically arranged in a central axis direction of the display screen, each group of projectors is configured to carry out projection onto a portion of an inner wall of the display screen, and light paths of the at least two groups of projectors are configured to avoid audiences and seats, the central axis being an axis that passes through a central point of the display screen so that the display screen is left-right symmetrical with respect to the central axis; and the method includes:

projecting, by each group of projectors according to different projection regions, sub display images transversely segmented from a to-be-displayed image; and splicing the sub display images to form a complete to-be-displayed image.

In an embodiment of the present application, prior to the projecting, by each group of projectors according to different projection regions, sub display images transversely segmented from a to-be-displayed image, the method further includes: segmenting an image according to the number of projectors and positions of the projectors, adjacent sub display images obtained upon segmentation having merging sides; and respectively transmitting the sub display images obtained upon segmentation to corresponding projectors.

Embodiments of the present application further provide a screen projection apparatus, carrying out projection onto a display screen, the display screen being of a fully-closed or partially-closed housing structure, an inner wall of the housing structure being configured to provide continuous images with a view angle of 180 degrees to 360 degrees in a horizontal direction; wherein the screen projection apparatus further includes: at least two groups of projectors, each group including at least one projector;

wherein the at least two groups of projectors are hierarchically arranged in a central axis direction of the display screen, each group of projectors is configured to carry out projection onto a portion of an inner wall of the display screen, and light paths of the at least two groups of projectors are configured to avoid audiences and seats, the central axis being an axis that passes through a central point of the display screen so that the display screen is left-right symmetrical with respect to the central axis;

each group of projectors is configured to project, according to different projection regions, sub display images transversely segmented from a to-be-displayed image, the sub display images being spliced to form a complete to-be-displayed image.

In an embodiment of the present application, each projector in each group of projectors is configured to carry out projection on a portion of the inner wall of the display screen that is perpendicular to the central axis thereof and each projector is configured to project longitudinal sub display images longitudinally segmented from the sub display image, the longitudinal sub display images being spliced to form the sub display image.

In an embodiment of the present application, at least one group of projectors in the at least two groups of projectors are configured to carry out projection onto a top portion of the inner wall of the display screen, and at least one group of projectors in the at least two groups of projectors are configured to carry out projection onto an intermediate portion of the inner wall of the display screen.

In an embodiment of the present application, the at least two groups of projectors are a first group of projectors that are arranged at an upper part in the central axis direction of the display screen, and a second group of projectors that are arranged at a lower part in the central axis direction of the display screen; wherein the first group of projectors is configured to carry out projection onto the intermediate portion of the inner wall of the display screen and is configured to project a lower-half image of the to-be-displayed image, and the second group of projectors is configured to carry out projection onto the top portion of the inner wall of the display screen and is configured to project an upper-half image of the to-be-displayed image.

In an embodiment of the present application, one merging side of the lower-half image of the to-be-displayed image is configured to merge with at least three merging sides of the upper-half image of the to-be-displayed image.

In an embodiment of the present application, the system further includes an image source processing apparatus, configured to segment an image according to the number of projectors and positions of the projectors, adjacent sub display images obtained upon segmentation having merging sides, and respectively transmit the sub display images obtained upon segmentation to corresponding projectors.

BRIEF DESCRIPTION OF THE DRAWINGS

To describe technical solutions according to the embodiments of the present application or in the related art, drawings that are to be referred for description of the embodiments or the related art are briefly described hereinafter. Apparently, the drawings described hereinafter merely illustrate some embodiments of the present application. Persons of ordinary skill in the art may also derive other drawings based on the drawings described herein without any creative effort.

DETAILED DESCRIPTION

At present, a novel display screen has been proposed. The display screen is of a fully-closed or partially-closed housing structure, and an inner wall of the housing structure is configured to provide continuous images with a view angle of 180 degrees to 360 degrees in a horizontal direction. The housing structure includes a cylindrical portion, wherein an inner wall of the cylindrical portion is arranged in a smooth arc line or straight line on an axial cross section. When the housing structure further includes one or two end portions, the one or two end portions are connected to the cylindrical portion in a smooth transition manner. For example, referring to FIG. 3, the cylindrical portion of the display screen is a cylindrical body, wherein a side wall of the cylindrical body is arranged on an axial cross section in a straight line, and the two end portions are both a hemispherical structure. Audiences are seated at the cylindrical body and face towards the hemisphere to watch the display image. Since the cylindrical portion of this novel display screen is an expansion of the end portions, when the image is displayed on both the end portions and the cylindrical portion, the audiences have a strong sense of immersion, and thus non-boundary feeling is improved for the audiences.

Figure 3:
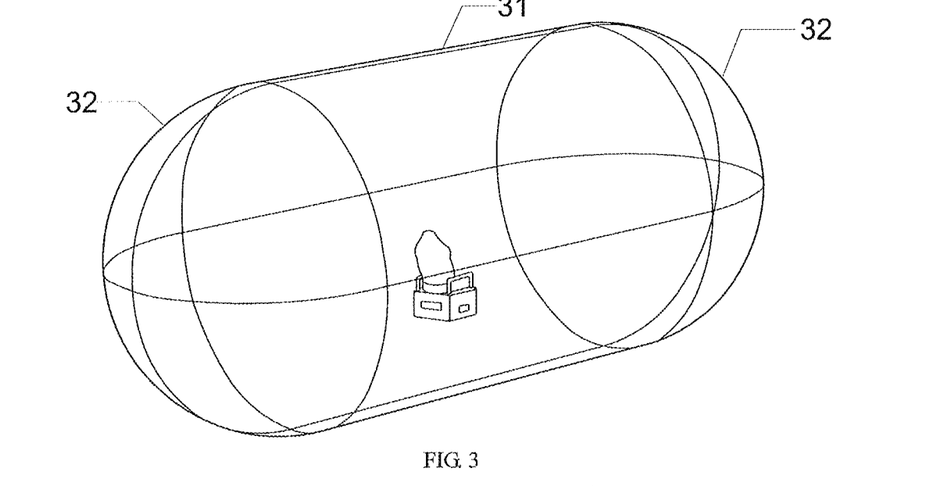
FIG. 3 is a schematic view of a capsule display screen.

However, since in the orthogonal projection method, the audiences need to be seated behind all the light paths, when the image is projected on the display screen as illustrated in FIG. 3 by using the orthogonal projection method, the projection light paths of the projectors which are configured to carry out projection onto the two sides may be shaded by the audiences, such that the display image on the sides is incomplete. Therefore, the audiences only see a complete display image in the front, and an incomplete display image on the sides. When the novel display screen employs the orthogonal projection method, the audiences are not ensured to acquire a full-degree display image, which severely affects the watching experience of the audiences.

Novel display screens of other shapes and irregular spherical display screen are likewise subject to the above situation. Therefore, the orthogonal projection method may not be applied to the irregular spherical display screen.

To make a person skilled in the art better understand the technical solutions of the present application, the technical solutions in the embodiments of the present application are described clearly and completely with reference to the accompanying drawings in the embodiments of the present application. Apparently, the described embodiments are merely some of rather than all of the embodiments of the present application. Based on the embodiments of the present application, all other embodiments derived by persons of ordinary skill in the art without any creative efforts shall fall within the protection scope of the present application.

A specific embodiment of the present application provides a screen projection system. The screen projection system includes: a display screen, at least two groups of projectors, wherein each group includes at least one projector.

The display screen is of a fully-closed or partially-closed housing structure, an inner wall of the housing structure is configured to provide continuous images with a view angle of 180 degrees to 360 degrees in a horizontal direction.

Specifically, referring to FIG. 3, the housing structure includes a cylindrical portion 31, wherein an inner wall of the cylindrical portion 31 is arranged in a smooth arc line or straight line on an axial cross section. When the housing structure further includes one or two end portions 32, the one or two end portions 32 are connected to two ends of the cylindrical portion 31 in a smooth transition manner.

Figure 4:
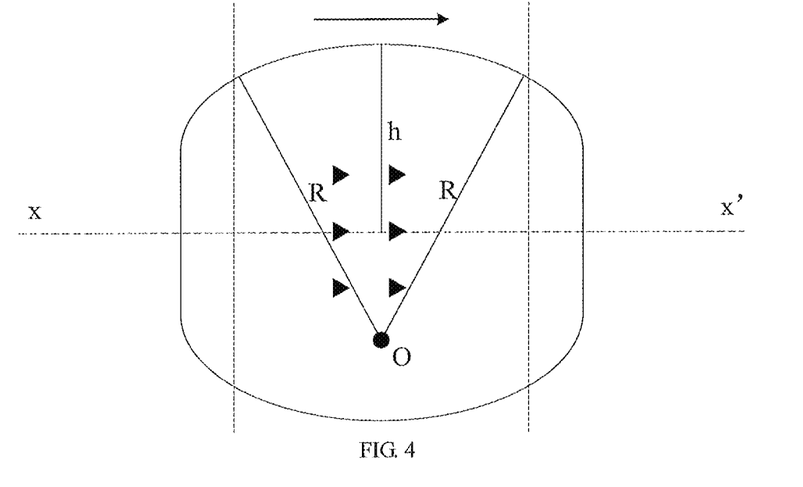
FIG. 4 is a schematic view of arrangement of a cylindrical portion of a display screen on an axial cross section in a smooth arc line.

Referring to FIG. 4, an intermediate part of two parallel dot lines represent the cylindrical portion, and in a specific embodiment of the present application, the side wall of the cylindrical portion is arranged in a smooth arc line on an axial cross section thereof; and other parts represent the end portions. The dotted line xx' represents an axis of the housing structure, and the radius of a circle corresponding to the arc line is R, and a maximum distance from the arc line to the axis xx' is h. R may be greater than or less than h. When R is greater than h or less than h, the housing structure may be an ellipsoid.

Figure 5:
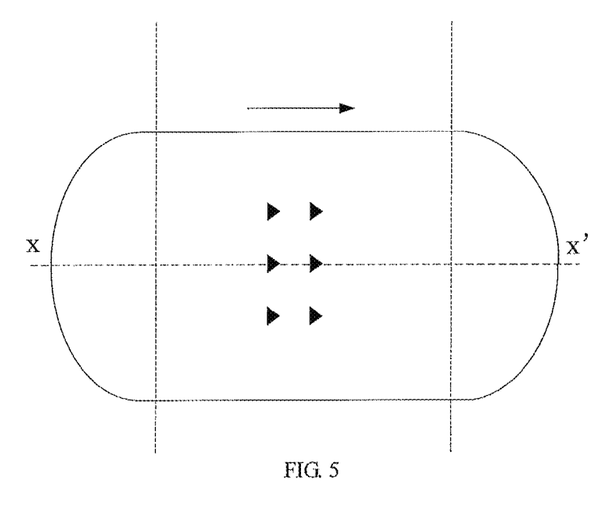
FIG. 5 is a schematic view of arrangement of a fully-enclosed housing structure in an axial cross section in a straight line.

Referring to FIG. 5, an intermediate part of two parallel dot lines represent the cylindrical portion, and in another specific embodiment of the present application, the side wall of the cylindrical portion is arranged in a straight line on an axial cross section thereof; and other parts represent the end portions. The dotted line xx' represents an axis of the housing structure.

The cross section of the cylindrical portion may be a circle, an ellipse, an unsymmetrical circle, a quadrangle with rounded corners or the like.

Regardless of as illustrated in FIG. 4 or FIG. 5, the audiences (represented by the solid black triangles) are all generally seated at the cylindrical portion, and face towards the display screen to watch the display image.

The screen projection system in this embodiment includes at least two groups of projectors. The at least two groups of projectors are hierarchically arranged in a central axis direction of the display screen, each group of projectors is configured to carry out projection onto a portion of an inner wall of the display screen, and light paths of the at least two groups of projectors are configured to avoid audiences and seats, the central axis being an axis that passes through a central point of the display screen so that the display screen is left-right symmetrical with respect to the central axis.

Each group of projectors is configured to project, according to different projection regions, sub display images transversely segmented from a to-be-displayed image, the sub display images being spliced to form a complete to-be-displayed image.

Therefore, according to the present application, with the hierarchically arranged projectors, a portion of the to-be-displayed image is respectively projected onto the inner wall of the display screen, and the light paths of the projectors avoid the audience seats. In this way, it is ensured that even if the display screen is of an irregular spherical shape, the projection light paths of the projectors are still not be shaded by the audiences. Therefore, this technical solution is applicable to different types of screens while the projection effect is ensured.

In another specific embodiment of the present application, each projector in each group of projectors is configured to carry out projection on a portion of the inner wall of the display screen that is perpendicular to the central axis thereof, and each projector is configured to project longitudinal sub display images longitudinally segmented from the display image, the longitudinal sub display images being spliced to form the sub display image.

Therefore, according to the present application, the number of projectors included in each group of projectors may be determined according to the size of the panoramic screen, luminance of the projectors, focal distance of the lens and the like parameters, such that the display effect of the display screen is ensured. The projectors according to the present disclosure are convenient and simple to install, and flexible to use, and thus is capable of better ensuring the display effect of the display screen.

The projection principle of the above technical solution is described hereinafter in detail with reference to a specific embodiment.

Figure 6:
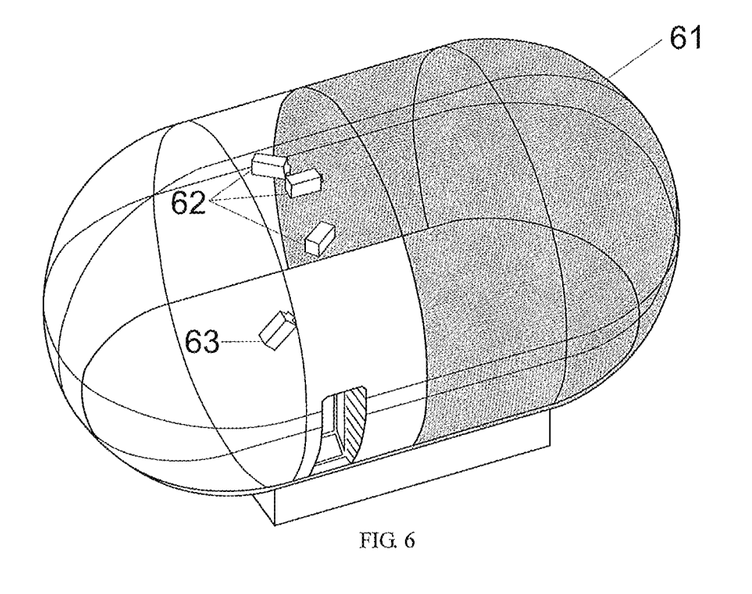
FIG. 6 is a structural block diagram of a screen projection system according to an embodiment of the present application.

Referring to FIG. 6, in this embodiment, the screen projection system includes a display screen 61, wherein the display screen 61 is of a fully-enclosed housing structure. The housing structure has a cylindrical portion which is a cylinder, and has end portions which are hemispheres. The bottom of the cylinder is "cut" to render a horizontal plane, such that audience seats are conveniently mounted. The central axis of the display screen is a vertical direction.

The system includes a first group of projectors 62 that are arranged at an upper part in the vertical direction, and a second group of projectors 63 that are arranged at a lower part in the vertical direction. The first group of projectors 62 is configured to carry out projection onto a lower half portion of an inner wall of the display screen 61 in the vertical direction and is configured to project a lower-half image of a to-be-displayed image; and the second group of projectors 63 is configured to carry out projection onto an upper half portion of the inner wall of the display screen 61 in the vertical direction and is configured to project an upper-half image of the to-be-displayed image.

Figure 7:
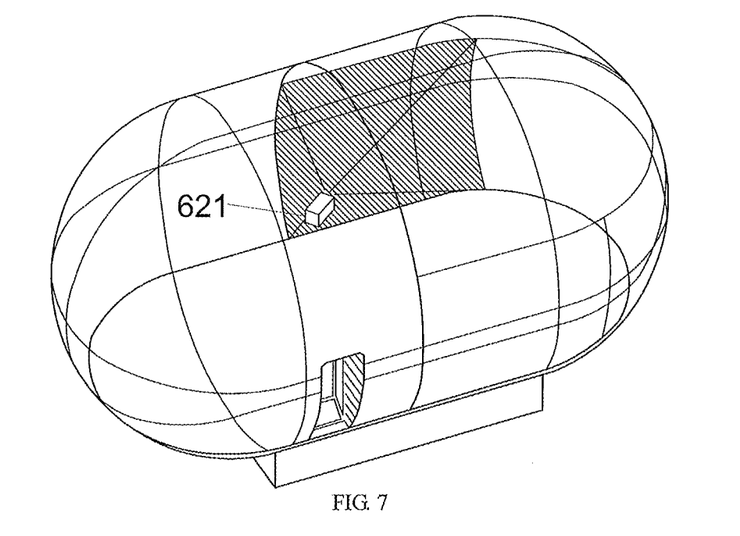
FIG. 7 is a schematic view of a projection position of a first projector in a screen projection system according to an embodiment of the present application.
Figure 8:
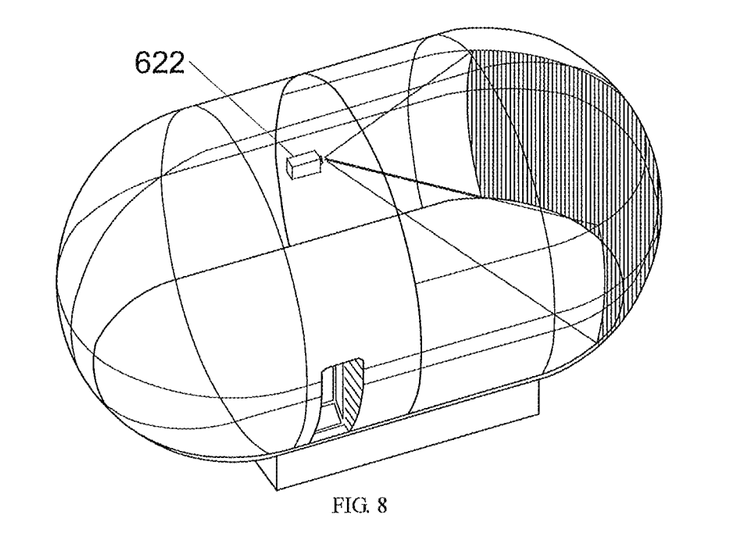
FIG. 8 is a schematic view of a display image projected by a second projector in a screen projection system according to an embodiment of the present application.
Figure 9:
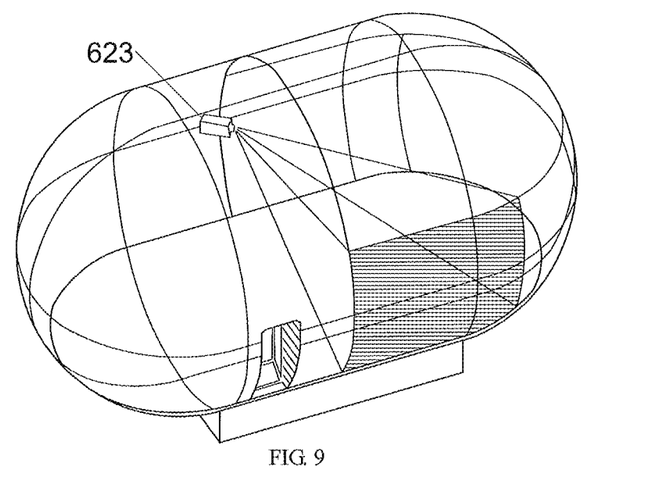
FIG. 9 is a schematic view of a display image projected by a third projector in a screen projection system according to an embodiment of the present application.

The first group of projectors 62 includes a first projector 621, a second projector 622 and a third projector 623. Referring to FIG. 7, the first projector 621 is configured to carry out projection onto a left region of the lower half portion of the inner wall of the display screen 61 in the horizontal direction, and is configured to project a left ⅓ image at the lower half part of the to-be-displayed image. Referring to FIG. 8, the second projector 622 is configured to carry out projection onto an intermediate region of the lower half portion of the inner wall of the display screen 61 in the horizontal direction, and is configured to project an intermediate ⅓ image at the lower half part of the to-be-displayed image. Referring to FIG. 9, the third projector 623 is configured to carry out projection onto a right region of the lower half portion of the inner wall of the display screen 61 in the horizontal direction, and is configured to project a right ⅓ image at the lower half part of the to-be-displayed image.

Figure 10:
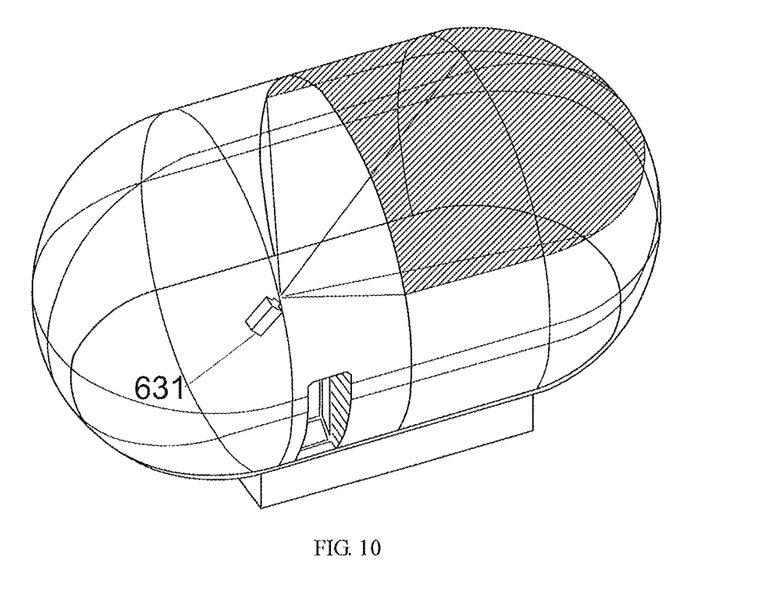
FIG. 10 is a schematic view of a display image projected by a fourth projector in a screen projection system according to an embodiment of the present application.

Referring to FIG. 10, the second group of projectors 63 include a fourth projector 631. The fourth projector 631 is configured to carry out projection onto the upper half portion of the inner wall of the display screen in the vertical direction, and is configured to project the upper-half image of the to-be-displayed image.

Figure 11:
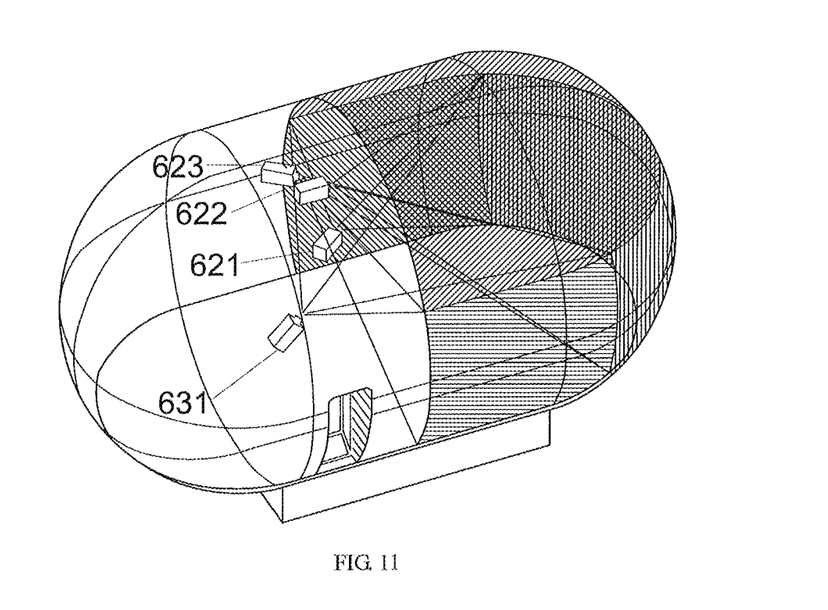
FIG. 11 is a schematic view of a display image projected by two groups of projectors in a screen projection system according to an embodiment of the present application.

Referring to FIG. 11, the first projector 621, the second projector 622 and the third projector 623 of the first group of projectors that are arranged at the upper part in the vertical direction are configured to carry out projection onto the lower-half portion of the inner wall of the display screen 61 in the vertical direction, and are configured to project the lower-half image of the to-be-displayed image. The first projector 621 is configured to project the left ⅓ image at the lower half part of the to-be-displayed image, the second projector 622 is configured to project the intermediate ⅓ image at the lower half part of the to-be-displayed image, and the third projector 623 is configured to project the right ⅓ image at the lower half part of the to-be-displayed image. The fourth projector 631 in the second group of projectors 63 is configured to project the upper-half image of the to-be-displayed image.

In another specific embodiment of the present application, the screen projection system may further include an image source apparatus. The image source apparatus is configured to segment a to-be-displayed image according to the number of projectors and positions of the projectors; wherein adjacent sub display images obtained upon segmentation have merging sides, and the sub display images obtained upon segmentation are respectively transmitted to corresponding projectors in real time. In this way, the corresponding projectors are configured to project corresponding sub display images onto the inner wall of the display screen 61.

Specifically, the image source apparatus is generally image segmentation processing software and may be installed in a computer, a server or the like hardware, which is not limited in the present application. The image may be a static picture or a dynamic video.

According to the present disclosure, the images obtained upon segmentation may be respectively copied to projectors corresponding to the images by using a U-disk or the like, which requires no real-time connection to the image source apparatus. Therefore, the installation position of the projectors is more flexible, and the problem that the display image fails to be projected due to an interruption of transmission between the projectors and the image source apparatus may be solved.

In another specific embodiment of the present application, for visual integrity of the display images from a plurality of projectors with no trace of splicing, adjacent sub display images all have an overlapped merging side, and deformation correction is carried out for the images with the overlapped merging sides, such that the adjacent sub display images is configured to merge to form one integral image.

Figure 12:
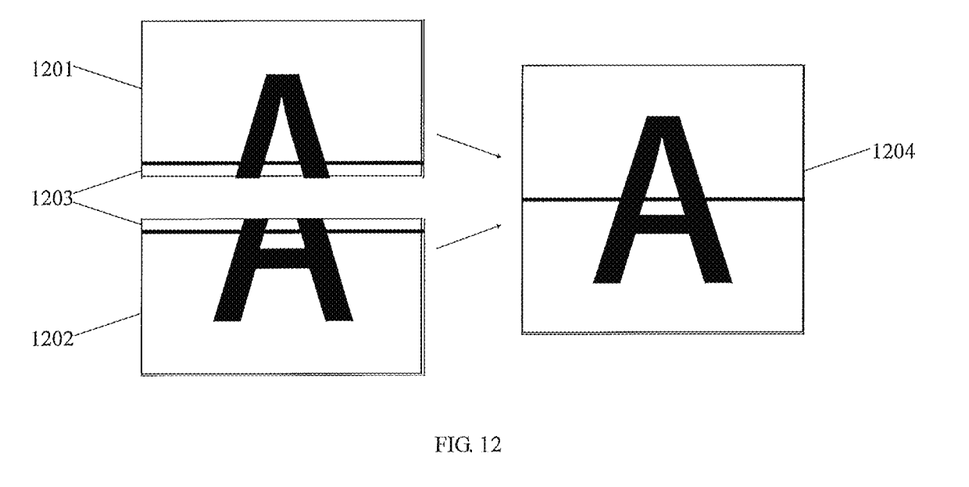
FIG. 12 is a schematic view of merging of display images in the related art.

For example, FIG. 12 is a schematic view of segmenting two sub display images and merging the images to form a display image. A sub display image 1201 displays an upper part of letter "A", and a sub display image 1202 displays a lower part of letter "A". These two sub display images are both a rectangular, and a merging side 1203 is arranged in the vicinity of a lower side of the sub display image 1201 and in the vicinity of an upper side of the sub display image 1202. Deformation correction is carried out for the image within the merging side 1203, such that the sub display image 1201 and the sub display image 1202 overlap on the merging side 1203, to form a complete display image 1204, that is, a complete letter "A".

In this embodiment, the three approximately rectangular display images projected by the first group of projectors is configured to merge side to side. That is, the left ⅓ image, the intermediate ⅓ image and the right ⅓ image are subjected to side-to-side merging via the merging sides thereof such that the lower-half image of the to-be-displayed image is formed. The lower-half image of the to-be-displayed image is configured to merge with the upper-half image of the to-be-displayed image projected onto the top portion the display screen 61.

Figure 13:
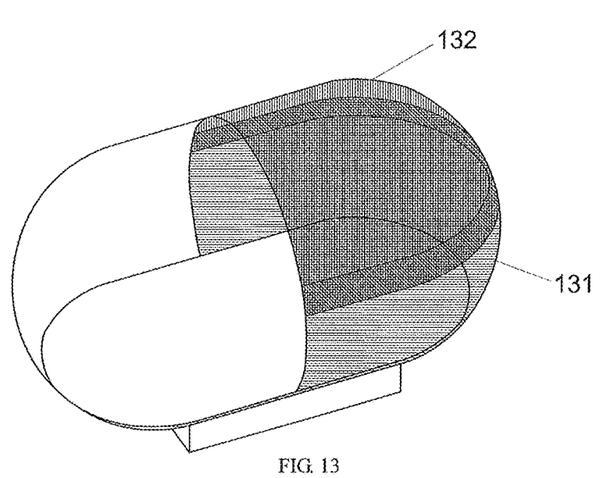
FIG. 13 is a schematic view of a merging region of a top display image and a belt-like display image in a screen projection system according to an embodiment of the present application.

Referring to FIG. 13, a lower-half image 131 of the to-be-displayed image deforms into a rectangular shape, and has only one merging side; whereas an upper-half image 132 of the to-be-displayed image deforms into a rectangular shape, and has three merging sides. Therefore, merging the lower-half image 131 of the to-be-displayed image and the upper-half image 132 of the to-be-displayed image may not simply employ side-to-side merging. Instead, the merging side of the lower-half image 131 of the to-be-displayed image needs to be segmented into three segments, and then merging is carried out.

In addition, if the upper-half image 132 of the to-be-displayed image is projected onto the top portion of the entire display screen, the upper-half image 132 of the to-be-displayed image deforms to a rectangular and has four merging sides. The merging sides of the lower-half image 131 of the to-be-displayed image need to be segmented into four segments, and then merging is carried out.

If the number of projectors in each group of projectors of the screen projection system is doubled, the increased projectors are configured to carry out projection onto a blank region of the display screen as illustrated in FIG. 3, and the increased projectors may be arranged to be front-rear symmetrical to the original projectors. In this way, a 360-degree panoramic image may be displayed on the display screen.

Since it is a common technical means in the art to merge the merging regions of the display images, this embodiment gives no detailed description thereto.

In addition, the calculation process of splicing and merging may be performed by the projectors, or may be performed by a computing server. The projectors or the computing server processes the merging region between the sub display images, and are configured to carry out merging correction between the sub display images, such that the sub display images are spliced to form a complete to-be-displayed image.

Figure 14:
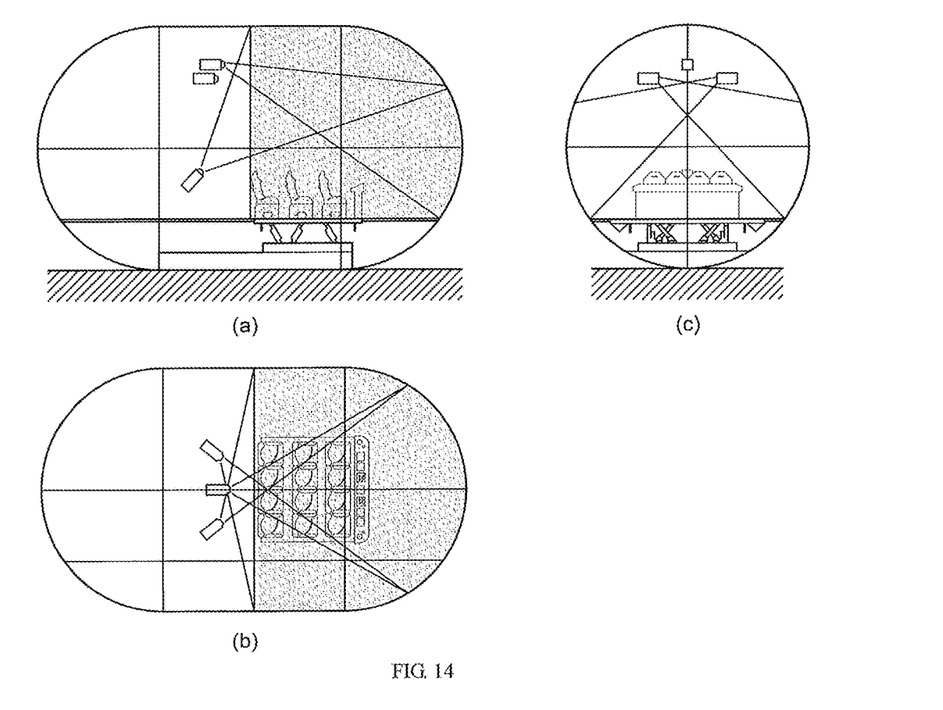
FIG. 14 is a schematic view of a projection cinema deployed with audience seats in a screen projection system according to an embodiment of the present application.

Referring to FIG. 14, FIG. 14 illustrates projection of the two groups of projectors when audience seats are arranged inside a semi-enclosed space formed by the display screen 61. FIG. 14(a) is a front view of projection onto the display screen 61, FIG. 14(b) is a top view of projection onto the display screen 61, and FIG. 14(c) is a left view of projection onto the display screen. Therefore, according to the present application, with the hierarchically arranged projectors, a portion of the to-be-displayed image is respectively projected onto the inner wall of the display screen, and the light paths of the projectors avoid the audience seats. In this way, it is ensured that even if the display screen is of an irregular spherical shape, the projection light paths of the projectors are still not be shaded by the audiences. This technical solution is applicable to different types of screens while the projection effect is ensured.

In addition, in this embodiment, the screen projection system is provided with two groups of projectors. In practice, the screen projection system may also be provided with three groups of projectors, and the three groups of projectors are hierarchically arranged in upper, intermediate and lower layers. Alternatively, the screen projection system may also be provided with four or more than four groups of projectors, which is not limited in the present application.

In this embodiment, in the two groups of projectors of the screen projection system, the first group includes three projectors, and the second group includes one projector. In practice, in the at least two groups of projectors of the screen projection system, each group includes at leas one projector. The specific number of projectors included in the group may be determined by a person skilled in the art according to the size of the display screen, the image display region, and the positions of the audience seats and the like.

Method Embodiments

The above embodiments illustrate a screen projection system according to the present application. The present application further provides an embodiment illustrating a screen projection method. The screen projection method is applied to a screen projection system. The screen projection system includes a display screen, wherein the display screen is of a fully-closed or partially-closed housing structure, and an inner wall of the housing structure is configured to provide continuous images with a view angle of 180 degrees to 360 degrees in a horizontal direction. The system further includes at least two groups of projectors, wherein each group includes at least one projector. The at least two groups of projectors are hierarchically arranged in a central axis direction of the display screen, each group of projectors is configured to carry out projection onto a portion of an inner wall of the display screen, and light paths of the at least two group of projectors are configured to avoid audiences and seats, the central axis being an axis that passes through a central point of the display screen so that the display screen is left-right symmetrical with respect to the central axis.

Figure 15:
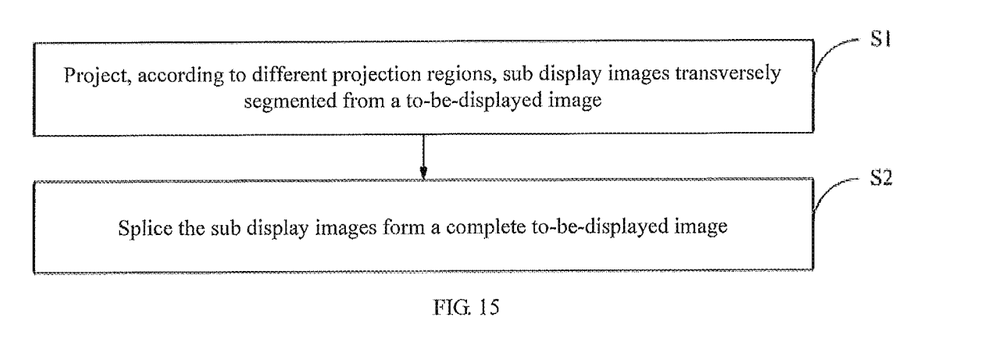
FIG. 15 is a flowchart of a screen projection method according to an embodiment of the present application.

Referring to FIG. 15, FIG. 15 is a flowchart of a screen projection method according to an embodiment of the present application. The screen projection method according to this embodiment includes the following steps:

step S1: projecting, by each group of projectors according to different projection regions, sub display images transversely segmented from a to-be-displayed image; and step S2: splicing the sub display images to form a complete to-be-displayed image.

In this embodiment, with the hierarchically arranged projectors, a portion of the to-be-displayed image is respectively projected onto the inner wall of the display screen, and the light paths of the projectors avoid the audience seats. Each group of projectors project, according to different projection regions, sub display images transversely segmented from a to-be-displayed image, the sub display images being spliced to form a complete to-be-displayed image. With the screen projection method according to this embodiment, it is ensured that even if the display screen is of an irregular spherical shape, the projection light paths of the projectors are still not be shaded by the audiences. This technical solution is applicable to different types of screens while the projection effect is ensured.

Figure 16:
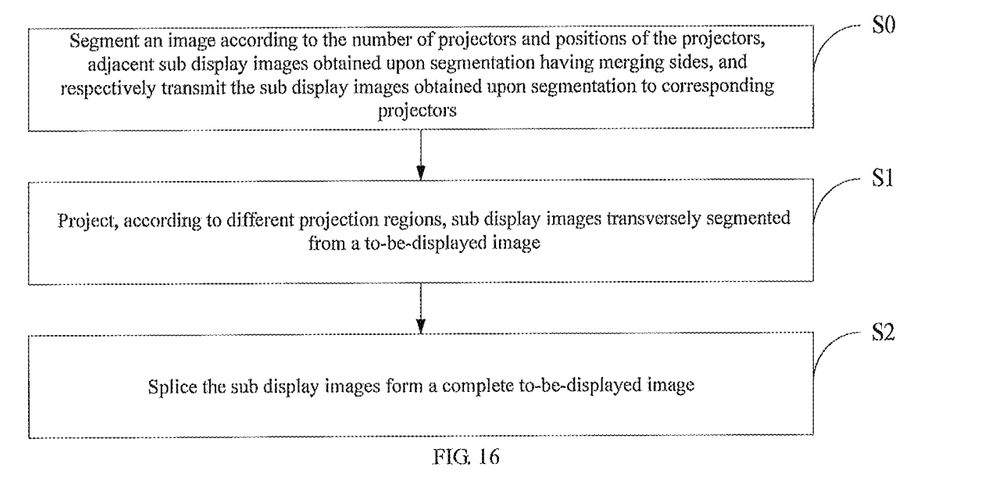
FIG. 16 is a flowchart of a screen projection method according to another embodiment of the present application.

In practice, referring to FIG. 16, prior to step S1, the screen projection method may further include step S0: segmenting an image according to the number of projectors and positions of the projectors, adjacent sub display images obtained upon segmentation having merging sides; and respectively transmitting the sub display images obtained upon segmentation to corresponding projectors.

When the at least two groups of projectors respectively project the sub display images onto the display screen, the overlapped merging sides of the adjacent sub display images may be configured to merge as one, such that the sub display images are spliced to form a complete to-be-displayed image.

The above embodiments illustrate a screen projection system and a screen projection method according to the present application. The present application further provides an embodiment illustrating a screen projection apparatus. In this embodiment, the screen projection apparatus is configured to carry out projection onto a display screen. The display screen is of a fully-enclosed or partially-closed housing structure. An inner wall of the housing structure is configured to provide continuous images with a view angle of 180 degrees to 360 degrees in a horizontal direction.

The screen projection apparatus includes at least two groups of projectors, wherein each group of projectors includes at least one projector. The at least two groups of projectors are hierarchically arranged in a central axis direction of the display screen, each group of projectors is configured to carry out projection onto a portion of an inner wall of the display screen, and light paths of the at least two groups of projectors are configured to avoid audiences and seats, the central axis being an axis that passes through a central point of the display screen so that the display screen is left-right symmetrical with respect to the central axis. Each group of projectors is configured to project, according to different projection regions, sub display images transversely segmented from a to-be-displayed image, the sub display images being spliced to form a complete to-be-displayed image.

According to the present application, with the hierarchically arranged projectors, a portion of the to-be-displayed image is respectively projected onto the inner wall of the display screen, and the light paths of the projectors avoid the audience seats. In this way, it is ensured that even if the display screen is of an irregular spherical shape, the projection light paths of the projectors are still not be shaded by the audiences. This technical solution is applicable to different types of screens while the projection effect is ensured.

In another specific embodiment illustrating the screen projection apparatus, each projector in each group of projectors is configured to carry out projection on a portion of the inner wall of the display screen that is perpendicular to the central axis thereof; and each projector is configured to project longitudinal sub display images longitudinally segmented from the sub display image, the longitudinal sub display images being spliced to form the sub display image.

In an embodiment illustrating the screen projection apparatus, at least one group of projectors in the at least two groups of projectors is configured to carry out projection onto a top portion of the inner wall of the display screen, and at least one group of projectors in the at least two groups of projectors is configured to carry out projection onto an intermediate portion of the inner wall of the display screen.

In an embodiment illustrating the screen projection apparatus, the at least two groups of projectors are a first group of projectors that are arranged at an upper part in the central axis direction of the display screen, and a second group of projectors that are arranged at a lower part in the central axis direction of the display screen; wherein the first group of projectors is configured to carry out projection onto the intermediate portion of the inner wall of the display screen and is configured to project a lower-half image of the to-be-displayed image, and the second group of projectors is configured to carry out projection onto the top portion of the inner wall of the display screen and is configured to project an upper-half image of the to-be-displayed image.

In an embodiment illustrating the screen projection apparatus, one merging side of the lower-half image of the to-be-displayed image is configured to merge with at least three merging sides of the upper-half image of the to-be-displayed image.

In an embodiment illustrating the screen projection apparatus, the system further includes an image source processing apparatus, configured to segment an image according to the number of projectors and positions of the projectors, adjacent sub display images obtained upon segmentation having merging sides; and respectively transmitting the sub display images obtained upon segmentation to corresponding projectors.

Various embodiments in the specification are described in a progressive manner. The same or similar parts between the embodiments may be referenced to each other. In each embodiment, the portion that is different from other embodiments is concentrated and described. In particular, with respect to the method and apparatus embodiments, since it is substantially similar to the system embodiment, brief description is given. The related portions may be referenced to the description of the portions in the system embodiment. The system and apparatus embodiments described above are merely illustrative, wherein the units and modules that are described as separate parts may be physically separated or may not be physically separated. In addition, some of or all of the units and modules may be selected according to actual needs to achieve the objectives of the solutions of the embodiments. Persons of ordinary skill in the art may understand and implement the present disclosure without paying any creative effort.

Described above are specific embodiments of the present application. It should be noted that persons of ordinary skill in the art may derive other improvements or polishments without departing from the principles of the present application. Such improvements and polishments shall be deemed as falling within the protection scope of the present application.

What is claimed is:

1. A movie-theatre screen projection system comprising:
   an immobile housing structure;
   projectors grouped in a first group of projectors and a second group of projectors; and
   a plurality of rows of seats;
   the housing structure having an inner wall serving as a display screen and configured to provide a continuous image with a horizontal panoramic view greater than 180 degrees and less than 360 degrees;

the housing structure comprising a cylindrical portion and an end portion connected to the cylindrical portion, the end portion having an arc-shaped horizontal cross section;

the first and second groups of projectors vertically arranged at different heights, at least one group of the first and second groups of projectors arranged above the plurality of rows of seats, each group of the first and second groups of projectors configured to project onto a portion of the inner wall, the first and second groups of projectors further configured to project through light paths above the plurality of rows of seats and occupants therein; and the plurality of rows of seats located completely within the cylindrical portion; and each group of the first and second groups of projectors configured to project sub-display images horizontally segmented from a to-be-displayed image, the sub-display images being spliced on the inner wall to form the to-be-displayed image.

2. The movie-theatre screen projection system according to claim 1, wherein more than one projectors in the first group of projectors project more than one vertically segmented images of one of the sub-display images, the vertically segmented images spliced to form the sub-display images.

3. The movie-theatre screen projection system according to claim 1, wherein the first group of projectors is configured to project onto a lower portion of the inner wall, and the second group of projectors is configured to project onto an intermediate portion of the inner wall.

4. The movie-theatre screen projection system according to claim 1, wherein the first group of projectors is vertically arranged above the second group of projectors, the first group of projectors is configured to project a lower-half image of the to-be-displayed image, and the second group of projectors is configured to project an upper-half image of the to-be-displayed image.

5. The movie-theatre screen projection system according to claim 4, wherein one merging side of the lower-half image of the to-be-displayed image is configured to merge with at least three merging sides of the upper-half image of the to-be-displayed image.

6. The movie-theatre screen projection system according to claim 1, wherein the system further comprises an image source processing apparatus, configured to segment an image according to a number of projectors and positions of the projectors, adjacent sub-display images obtained upon segmentation having merging sides, and to respectively transmit the sub-display images obtained upon segmentation to corresponding projectors.

7. The movie-theatre screen projection system according to claim 1, wherein a cross section of the cylindrical portion has one of a circle, an ellipse, an unsymmetrical circle, a quadrangle with rounded corners shape.

8. The movie-theatre screen projection system according to claim 1, wherein a horizontal cross section of the cylindrical portion has a substantially rectangular shape.

9. The movie-theatre screen projection system according to claim 1, wherein the housing structure is closed or partially-closed.

10. A method for projecting onto a screen in a movie-theatre, the movie-theatre comprising an immobile housing structure, projectors grouped in a first group of projectors and a second group of projectors, and a plurality of rows of seats, the housing structure comprising a cylindrical portion and an end portion connected to the cylindrical portion, the end portion having an arc-shaped horizontal cross section, the method comprising:

configuring an inner wall in the housing structure to provide continuous images with a panoramic view greater than 180 degrees and less than 360 degrees in a horizontal direction;

arranging the first and second groups of projectors vertically at different heights, at least one group of the first and second groups of projectors arranged above the plurality of rows of seats;

causing each group of the first and second groups of projectors to project onto a portion of the inner wall through light paths above the plurality of rows of seats and occupants therein;

locating the plurality of rows of seats completely within the cylindrical portion of the housing structure;

projecting, by the each group of the first and second groups of projectors, sub-display images horizontally segmented from a to-be-displayed image; and splicing the sub-display images to form the to-be-displayed image.

11. The method according to claim 10, further comprising:

segmenting the to-be-displayed image according to a number of projectors and positions of the projectors;

providing merging sides on adjacent sub-display images; and transmitting the respective segmented sub-display images to corresponding projectors.

12. A movie-theatre screen projection apparatus, used in an immobile housing structure having a plurality of rows of seats, an inner wall of the housing structure serving as a display screen and configured to provide continuous images with a panoramic view greater than 180 degrees and less than 360 degrees, the housing structure comprising a cylindrical portion and an end portion connected to the cylindrical portion, the end portion having an arc-shaped horizontal cross section, the apparatus comprising:

projectors grouped in a first group of projectors and a second group of projectors, the first group of projectors and the second group of projectors vertically arranged at different heights, at least one group of the first and second groups of projectors arranged above the plurality of rows of seats, each group of the first and second groups of projectors configured to project onto a portion of the inner wall, the first and second groups of projectors further configured to project through light paths above the plurality of rows of seats and occupants therein, the plurality of rows of seats completely located within the cylindrical portion; and the each group of the first and second groups of projectors configured to project sub-display images horizontally segmented from a to-be-displayed image, the sub-display images being spliced on the inner wall to form the to-be-displayed image.

13. The movie-theatre screen projection apparatus according to claim 12, wherein more than one projectors in the first group of projectors project more than one vertically segmented images of one of the sub-display images, the vertically segmented images spliced to form the one of the sub-display images.

14. The movie-theatre screen projection apparatus according to claim 12, wherein the first group of projectors is configured to project onto a lower portion of the inner wall, and the second group of projectors is configured to project onto an intermediate portion of the inner wall.

15. The movie-theatre screen projection apparatus according to claim 12, wherein the first group of projectors is vertically arranged above the second group of projectors, the first group of projectors is configured to project a lower-half image of the to-be-displayed image, and the second group of projectors is configured to project an upper-half image of the to-be-displayed image.

16. The movie-theatre screen projection apparatus according to claim 15, wherein one merging side of the lower-half image of the to-be-displayed image is configured to merge with at least three merging sides of the upper-half image of the to-be-displayed image.

17. The movie-theatre screen projection apparatus according to claim 12, further comprising an image source processing apparatus, configured to segment an image according to a number of projectors and positions of the projectors, adjacent sub-display images obtained upon segmentation having merging sides, and to respectively transmit the sub-display images obtained upon segmentation to corresponding projectors.

\* \* \* \* \*